United States Patent [19]

Gowrinathan

[11] 4,030,831
[45] June 21, 1977

[54] PHASE DETECTOR FOR OPTICAL FIGURE SENSING

[75] Inventor: Sankaran Gowrinathan, Westport, Conn.

[73] Assignee: The United States of America as represented by the Secretary of the Navy, Washington, D.C.

[22] Filed: Mar. 22, 1976

[21] Appl. No.: 669,412

[52] U.S. Cl. .............................. 356/109; 356/113
[51] Int. Cl.² ........................................ G02B 9/02
[58] Field of Search ............... 356/106 R, 109, 113; 250/550; 350/3.5

[56] References Cited

UNITED STATES PATENTS

| 3,175,088 | 3/1965 | Herriott | 356/113 X |
| 3,566,021 | 2/1971 | Jakes, Jr. | 350/3.5 X |
| 3,856,986 | 12/1974 | Macouski | 350/3.5 X |

Primary Examiner—John K. Corbin
Assistant Examiner—Matthew W. Koren
Attorney, Agent, or Firm—Richard S. Sciascia; Don D. Doty; Harvey A. David

[57] ABSTRACT

Phase detection between interfering light beams in an interferometric system is accomplished by frequency shifting the reference beam prior to combination with the interrogation beam and electro-optically scanning the resulting pattern to produce an FM electrical signal having the shift frequency as a carrier and the interrogated parameter as the modulation data. A phase lock loop is responsive to the FM signal to provide a D.C. signal that is analogous of rate of change of the interrogated parameter with scan, and which is integrated to provide an output voltage signal that is proportional to the interrogated parameter and the corresponding optical phase difference. The method and system employing it are operative for a wide range of phase differences including multiple fringes.

2 Claims, 4 Drawing Figures

PHASE DETECTOR FOR OPTICAL FIGURE SENSING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the art of interferometry and more particularly to an improved interferometric method and apparatus that is characterized by a wide linear range.

The phase difference between two portions of a light beam can be measured interferometrically. In most systems, wherein it is desired to produce an electrical signal corresponding thereto for control, recording, or display purposes, the optical beams are intensity modulated at a predetermined frequency and photo diode detected to provide two sine wave modulated electrical signals having an electrical phase difference that is a function of the optical phase difference. These electrical signals are then processed with a phase detector to obtain the optical phase difference. A problem arises when the phase difference is greater than $\pm \pi$. Since sine waves repeat themselves, it is difficult to measure, with the foregoing systems, optical phase differences that give rise to multiples of $\pi$, primarily because of the modulo $2\pi$ ambiguity that exists.

In the case of analyzing interferograms, for example to determine the surface quality or optical figure of a mirror, it is desirable, indeed necessary as a practical matter, to be able to detect surface anomalies from point to point that give rise to multiple interference fringes as well as fractions of a fringe. This, of course, requires a wide linear range. Extensions of linear range in interferometric apparatus have been accomplished heretofore by using dividers and counters to, in effect, digitally count fringes or lines from an assigned starting point. While such systems have been beneficial in certain laboratory and industrial applications, they suffer the disadvantages of being inherently electrically "noisy" and of being limited in speed of operation. These disadvantages become important, for example, in a system for detecting and control of wavefront distortion in a high energy laser beam. The practicality of such a system requires interferometric determination of the phase distortions of the beam wavefront and generation of suitable electrical control signals for actuating wavefront correction means, such as a deformable mirror, so as to remove the distortions.

SUMMARY OF THE INVENTION

The present invention aims to overcome some or most of the disadvantages of the prior art through the provision of a novel method and apparatus wherein interfering light beams are frequency modulated in a sinusoidal manner, rather than amplitude modulated, the interference pattern then being scanned by photodiode means to generate a sinusoidally varying electrical signal containing the desired optical phase data that is frequency detected by a phase lock loop to provide a voltage signal representative of instantaneous rate of change of optical phase. This rate of change signal is integrated over the scan period to provide an output voltage that is analogous to total optical phase difference.

With the foregoing in mind, it is a general object of the invention to provide an improved interferometric method and apparatus.

Another object of the invention is the provision of an improved method and apparatus for optical figure sensing that is capable of accurate and rapid analysis of interferograms over a wide linear range including multiple fringes.

Still another object is the provision of an interferometer system wherein the problem of modulo $2\pi$ ambiguity, characteristic of multiple wave length phase differences, is avoided without resort to counting networks.

Yet another object of the invention is the provision of a method and apparatus of the foregoing character which is capable of yielding an analog voltage output that can readily be used in recording or in controlling means for introducing optical phase difference compensations into an optical system so as to actively maintain a wavefront within desired limits of distortion.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
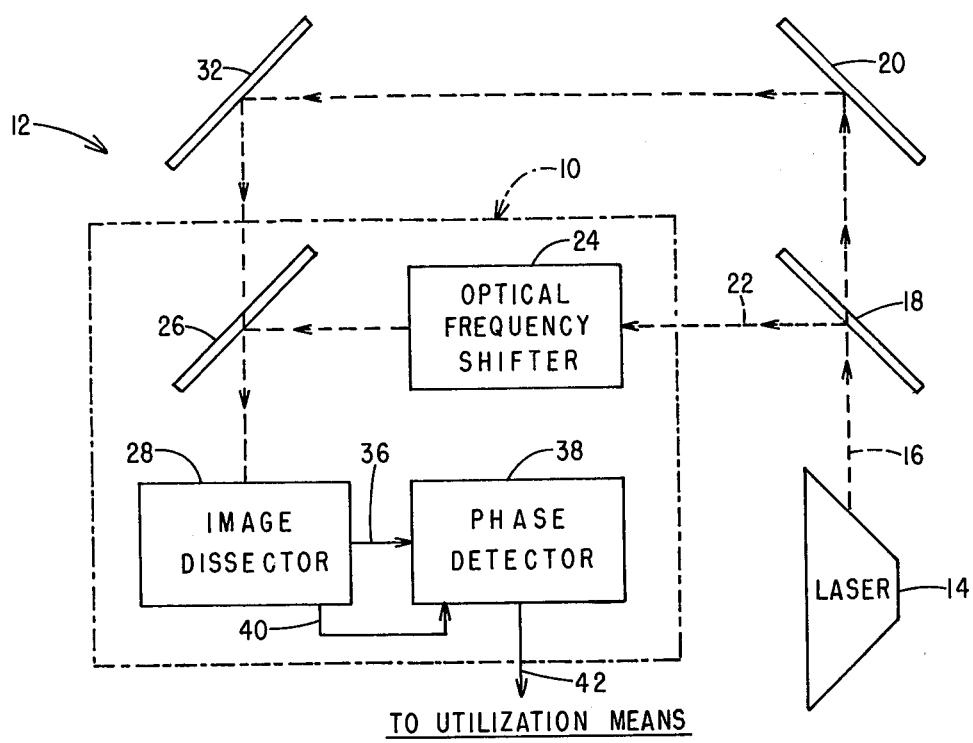
FIG. 1 is a diagrammatic illustration of a laser optical system embodying the invention.

Turning to FIG. 1, the invention will be described as embodied in an optical phase sensing apparatus 10 forming part of an exemplary interferometer, indicated generally at 12. Interferometer 12 is substantially in a Mach-Zehnder configuration suitable for testing the surface quality, or figure, of a test mirror 20, with apparatus 10 providing an electrical output analogous of deviations or anomalies in the test mirror surface. It will be understood, of course, that the optical phase sensing method and apparatus of this invention can be used in other interferometric systems, the interferometer 12 being only one example.

In the interferometer 12, a coherent light source in the form of a laser 14 provides a linearly polarized light beam 16 which is directed upon a beamsplitter 18 that is so disposed in the beam path that a portion of the beam is passed to illuminate a test mirror 20 as an interrogation beam, and another portion is diverted to form a reference beam 22. The reference beam 22 is passed through a frequency shifter 24 of apparatus 10 that produces a predetermined frequency shift in the reference beam.

The frequency modulator 24 may comprise a birefringent plate that is rotated at the modulation frequency or, as will be described with reference to FIG. 2, an electro-optical means for accomplishing the effect of such a rotating birefringent plate. The modulated reference beam is diverted by a mirror 26 of the partially reflecting beamsplitter type to an image dissector 28, forming part of apparatus 10 and discussed more fully hereinafter with reference to FIG. 3.

The interrogation beam portion of beam 16, falling on test mirror 20, is reflected via a mirror 32, through the beamsplitter type mirror 26 so as to be recombined with the reference beam and form an interference pattern or image that is characteristic of the surface quality of test mirror 20 and the frequency modulator 24.

The image dissector 28, which is a photo-electric scanner, provides an output in the form of an electrical signal having an A.C. component that is the resultant of the modulant of the modulation frequency $W_f$ and such perturbations as are present in the interference pattern scanned by the dissector. This electrical signal is applied, as shown by line 36, to a phase detector 38. A phase detector clear signal is also provided from the image dissector 28 to the phase detector 38, as shown by line 40, for a purpose which will later be made apparent.

Phase detector 38, as will be discussed with reference to FIG. 4, processes the output of dissector 28 to provide an electrical analog voltage output signal that varies in accordance with the total algebraic phase difference between the reference and interogation beams as the interference image or pattern is scanned. This total phase representing analog voltage output is represented by line 42, and can be applied to any desired utilization means such as a tracing recorder, measurement indicator, or a wavefront correction means that accepts the output signal as a feedback control signal. In the case of the present arrangement, for example, the analog signal can control devices that flex the test mirror 20 (or the mirror 32 if desired) in a manner tending to eliminate wavefront distortion in the portion of the interrogation beam arriving at beamsplitter type mirror 26. Such a feedback system forms no part of the invention per se but is mentioned as a type of utilization means with which the invention has been successfully experimentally employed.

Figure 2:
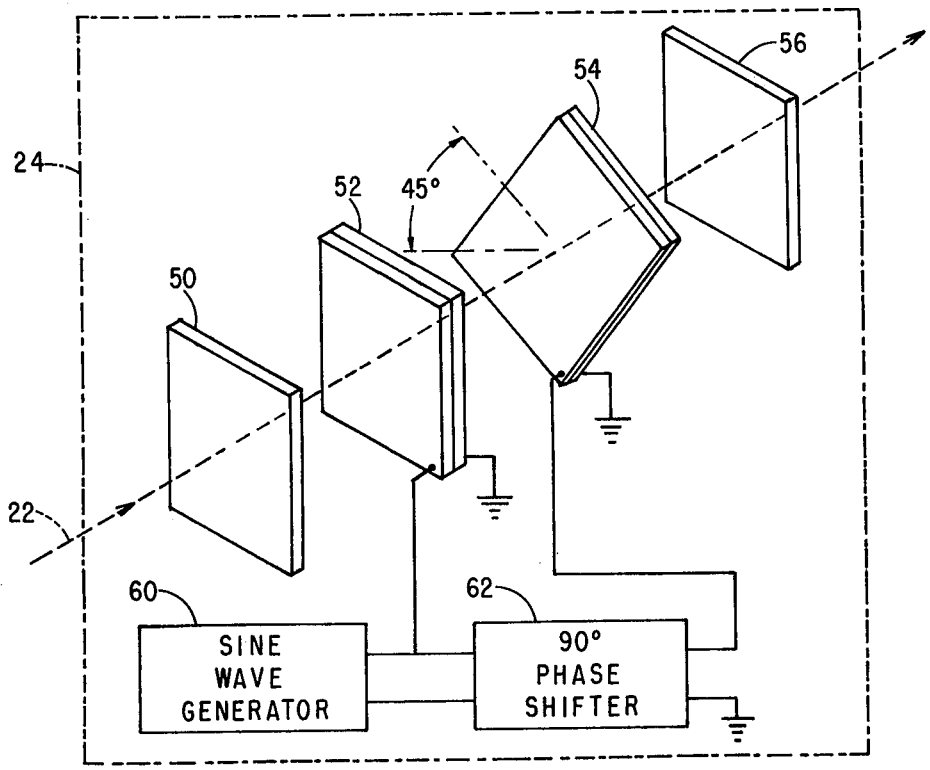
FIG. 2 is a more detailed illustration of the frequency shifter portion of the system of FIG. 1.

Referring now to FIG. 2, the preferred form of frequency modulator 24 is seen to comprise a first birefringent quarter-wave plate 50 which acts as a left hand circular polarizer, a first electro-optic crystal 52 having its principal axes aligned with beam 16, a second electro-optic crystal 54 having its principal axes aligned with beam 16 and having a lateral axis oriented 45° from the corresponding lateral axis of electro-optic crystal 52, and a second birefringent quarter-wave plate 56 which serves as a right hand circular analyzer.

The modulator 24 further comprises a source 60 of sinusoidal alternating current, and a 90° phase shifter 62. The A.C. source 60 and the phase shifter 62 are connected to the electro-optic crystals 52 and 54, as shown, so as to be energized by modulation voltages applied in phase quadrature.

The described system simulates the action of a rotating birefringent plate to provide a separable component of the reference beam that is shifted in frequency (modulated) at the frequency of the A.C. source 60. The optical rotation is accomplished by the use of the Pockels electro-optic effect in the first and second electro-optic crystals 52, 54, which are conveniently of the potassium dihydrogen phosphate (KDP) crystal type. This rotation can transform a left-hand, circularly-polarized light beam so that a right-hand circularly-polarized component is produced at one of the modulation sideband frequencies. The displacement of this frequency is limited only to the maximum frequency at which the electro-opitc effect can be produced.

Incoming plane-polarized light (beam 22) is passed through plate 50 that acts as a left-hand circular polarizer. The resulting polarized light is passed through the two electro-optic crystals along their principal optic axes and then through plate 56 that serves as a right hand circular analyzer (the mirror image of the polarizer). The output light from the crystals 52, 54, consists of a left hand component of one frequency and a right hand component of a second fixed amplitude. The left hand component rotates in synchronism with the input left hand polarized light. However, the right hand component executes one additional right hand cycle of rotation during each modulation cycle; therefore, the frequency of this component is the sum of the input light frequency and the modulation frequency (i.e., the upper sideband frequency.) The right hand analyzer plate 56 blocks the left hand component and passes only the desired, frequency shifted right hand component to mirror 26 and image dissector 28 as the frequency shifted reference beam. In the present example the modulation frequency $W_o$ is selected to be 100 kHz.

Figure 3:
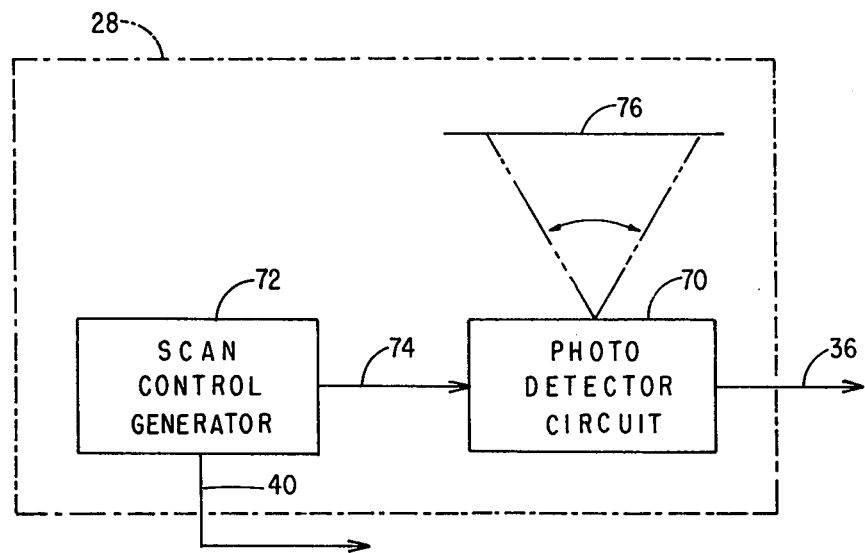
FIG. 3 is a more detailed diagrammatic illustration of the image dissector portion of the system of FIG. 1.

Referring now to FIG. 3, the image dissector 28 comprises a conventional scanning photo-detector circuit 70 comprising a light sensitive element and suitable video amplifier adapted to provide an electrical output signal that varies in voltage with the intensity of light received during scanning.

The photo-detector circuit 70 is controlled by a scan control generator 72 which provides deflection signals, represented by line 74, to the scanning photo-detector circuit. The latter is responsive to the deflection signals to scan along a predetermined sweep path across the interference pattern or interferogram 76 resulting from the recombination of the frequency shift modulated reference beam and the interrogation beam. The sweep path may include a plurality of segments in a predetermined sequence, or may comprise a raster, or other programmed sweep depending upon the degree of resolution desired, for example, in the determination of the surface quality of mirror 20. The particular sweep period employed is not particularly significant, but should be compatible with the operation of any data storage means that may be used with the apparatus, and compatible with the operation of the contemplated utilization means. Suffice it to say that in one experimental embodiment of the invention, corresponding to the example being described, a scan period of 0.1 sec was utilized.

The earlier mentioned phase detector clear signal is conveniently generated by the scan control generator at the beginning of each sweep period, and serves to ready the phase detector 38 for processing of the output of the photo-detector circuit 70 during the following scan period. That output $I_s$, line 36, it will be recalled comprises an A.C. signal having a frequency that is the resultant of the 100 kHz modulation frequency $W_o$ and changes detected in the optical phase relationship of the reference and interrogation beams during the scan. This can be written $$I_s = K_d \sin[W_o t + \theta(t)]$$

where $K_d$ equals a gain constant, $W_o$ is the optical frequency shift in the reference beams, and $\theta(t)$ present as the information. Demodulation of the carrier to detect the phase information is accomplished in the phase detector 38 about to be described.

Figure 4:
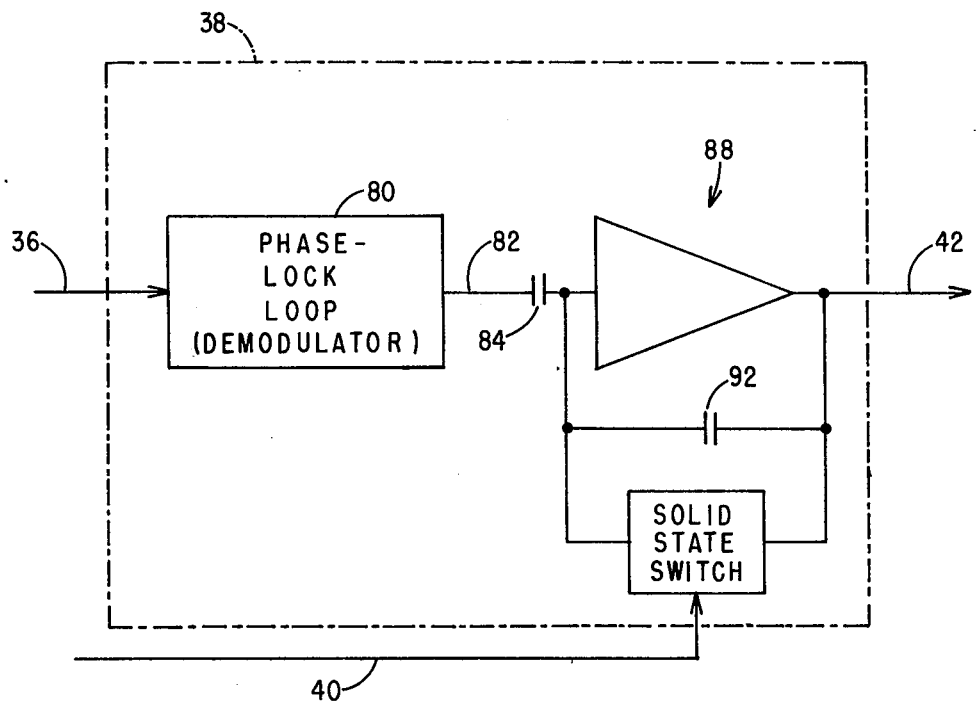
FIG. 4 is a more detailed diagrammatic illustration of the phase detector portion of the system of FIG. 1.

Referring to FIG. 4, the phase detector portion 38 of the apparatus 10 comprises a phase-lock loop 80 that receives the output $I_s$ of the photo-detector circuit 70 and provides an analog voltage $V_r$ that varies with $d\theta/dt$, or the rate of change of phase as the sweep occurs. The phase-lock loop may be of conventional construction, a suitable commercially available one being the Signetics NE 565. The output of phase-lock loop 80 is coupled by a coupling capacitor 84 to the input of an integrator 88. Capacitor 84 blocks the D.C. component of the phase rate signal $V_r$ and passes the varying component for integration.

Integrator 88 comprises a conventional operational amplifier 90 having an accumulating feedback capacitor 92. The output of integrator 88, line 42, is a phase representing voltage $V_p$, where $V_p = \theta(t)$, the desired output of the apparatus 10.

Integrator 88 further comprises a clearing switch 94, conveniently a solid state switch, that is connected across capacitor 92 and responds to the earlier mentioned clear signal, line 40. Switch 94 is closed momentarily at the beginning of each scan so as to clear or reset the integrator 88 for upcoming scan from a predetermined reference point. During each scan, optical phase differences of a number of wavelengths, or fringes, can be detected, with the output voltage $V_p$ following the optical phase differences as the sweep progresses. Thus, if the scan begins at a reference point, a sample of $V_p$ at any other selected point will provide a direct indication of the difference, if any, of the optical phase at the selected point relative to the reference point, irrespective of whether the difference be a fraction of a fringe or a plurality of fringes.

From the foregoing, it will be appreciated that the invention accomplishes the earlier stated objects and advantages through the apparatus and method wherein a predetermined frequency shift is introduced into one of the reference and interrogation beams in an interferometric system so that upon combining of said beams and electro-optical sensing a signal will be extracted that constitutes a carrier frequency that has been frequency modulated according to optical phase differences in the beams. Phase-lock loop demodulation of the frequency modulated carrier and subsequent integration of the resulting phase rate signal provides an analog voltage output representative of the optical phase differences.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Interferometric apparatus for generating an analog voltage output signal corresponding to the optical quality of a test surface, said apparatus comprising:

light source means for providing a test surface illuminating interrogation beam and a reference beam capable of producing interference patterns as a function of the optical phase difference between wavefronts in said beams;

frequency shifter means, mounted in the path of one of said beams, for introducing a predetermined frequency shift in said one of said beams;

image dissector means, mounted so as to be responsive to interference between said reference beam and said interrogation beam, for providing a frequency modulated electrical signal characterized by a carrier frequency equal to said predetermined frequency shift and frequency modulated in accordance with said optical phase difference, said image dissector means comprising signal generator means, for generating electrical sweep signals that vary as a predetermined function of time and a scanning photo-electric detector means, responsive to said sweep signals, for effecting predetermined scans of said interference patterns; and phase detector means, responsive to said frequency modulated electrical signal, for providing an analog output signal which varies with changes in said optical phase difference, said phase detector means comprising phase lock loop means, responsive to said frequency modulated electrical signal, for demodulation thereof to provide an intermediate analog signal corresponding to rate of change of said phase difference, and integrator means, connected to said phase lock loop means, for integration of said intermediate analog signal with respect to time so as to provide said analog output signal.

2. Interferometric apparatus as defined in claim 1, and wherein:

said signal generator means further generates clearing signals; and said phase detector means further comprises means, responsive to said clearing signals, for clearing said integrator means between each of said sweeps.

* * * * *